(12) United States Patent
Yen et al.

(10) Patent No.: US 7,492,842 B2
(45) Date of Patent: Feb. 17, 2009

(54) METHOD FOR ANTENNA DIVERSITY

(75) Inventors: Kuang-Yu Yen, Taichung (TW);
Chin-Yu Hsu, Toucheng Township, Yilan County (TW)

(73) Assignee: Realtek Semiconductor Corp., Hsinchu (TW)

( * ) Notice: Subject to any disclaimer, the term of this patent is extended or adjusted under 35 U.S.C. 154(b) by 686 days.

(21) Appl. No.: 10/924,580

(22) Filed: Aug. 24, 2004

(65) Prior Publication Data

US 2005/0063486 A1 Mar. 24, 2005

(30) Foreign Application Priority Data

Sep. 19, 2003 (TW) .............................. 92125991 A

(51) Int. Cl.
*H04B 7/10* (2006.01)

(52) U.S. Cl. ...................................... 375/347

(58) Field of Classification Search ................. 375/267, 375/347, 349; 700/53; 455/101, 132–141
See application file for complete search history.

(56) References Cited

U.S. PATENT DOCUMENTS

| | | | | |
|---|---|---|---|---|
| 5,203,027 A * | 4/1993 | Nounin et al. | ............... | 455/134 |
| 5,481,571 A * | 1/1996 | Balachandran et al. | ...... | 375/347 |
| 5,748,676 A * | 5/1998 | Mahany | ....................... | 375/260 |
| 6,628,732 B1 * | 9/2003 | Takaki | .......................... | 375/345 |
| 2002/0122397 A1 * | 9/2002 | Ling et al. | ................... | 370/335 |
| 2002/0164963 A1 * | 11/2002 | Tehrani et al. | .............. | 455/101 |
| 2003/0026366 A1 * | 2/2003 | Matsui et al. | ................ | 375/347 |
| 2003/0143973 A1 * | 7/2003 | Nagy et al. | .................. | 455/403 |

* cited by examiner

*Primary Examiner*—Sam K Ahn
(74) *Attorney, Agent, or Firm*—Thomas, Kayden, Horstemeyer & Risley

(57) ABSTRACT

The invention provides a method for antenna diversity. The method comprises: using a first antenna to receive a signal, recording a first average signal intensity of the signal within a checking time, comparing the first average signal intensity with a threshold signal intensity, and recording a next first average signal intensity if the current first average signal intensity is stronger than the threshold signal intensity, otherwise switching to a second antenna to receive the signal and recording a second average signal intensity within the checking time. The method further comprises the following steps if the first antenna switches to the second antenna: comparing the first average signal intensity to the second signal intensity, and recording the next second average signal intensity within the checking time if the second average signal intensity is greater than the first average signal intensity, otherwise switching back to the first antenna to receive the signal.

7 Claims, 5 Drawing Sheets

METHOD FOR ANTENNA DIVERSITY

This application claims the benefit of Taiwan application Serial No. 092125991, filed on Sep. 19, 2003, the subject matter of which is incorporated herein by reference.

BACKGROUND OF THE INVENTION

1. Field of the Invention

The invention relates to an antenna diversity method for a wireless network adapter.

2. Description of the Related Art

In a wireless local area network (WLAN), the antenna diversity of a wireless network adapter conventionally utilizes the method of packet-by-packet signal intensity comparison. FIG. 1 is a flowchart showing a conventional antenna diversity method of a packet-by-packet signal intensity comparison. As shown in FIG. 1, when the wireless network adapter has detected that a packet is inputted, the signal intensity of this antenna (e.g. antenna A) will be judged first, and then the operating antenna is switched to another antenna (e.g. antenna B). Thereafter, the wireless network adapter compares the signal intensities of the two antennas, and the operating antenna is switched to the antenna with the larger intensity. Therefore, each time when the packet enters, the wireless network adapter repeats this step. When the system wants to transmit the packet, the packet is transmitted through the selected antenna.

Although this diversity method of packet-by-packet detection has better performance under the condition of serious signal's fast fading, switching the antenna may cause serious DC offset when the radio frequency (RF) architecture is under the direct conversion. Thus, the precise value of measuring the received signal intensity after the switching cannot be obtained until the DC offset disappears. However, if the time length of preamble signal is quite short (for example, 8 μs in the IEEE 802.11 a/g condition), there is not enough time to measure the received signal intensity after the DC offset disappears.

Consequently, the diversity method of packet-by-packet detection encounters the above-mentioned problem when the time length of preamble signal is short and the radio frequency adopts the direct conversion architecture.

SUMMARY OF THE INVENTION

It is therefore an object of the invention to provide an antenna diversity method without packet-by-packet detection.

To achieve the above-mentioned object, the method of the present invention includes the following steps: receiving the packets of a signal by a first antenna and recording a first average signal intensity within a checking time, comparing the first average signal intensity with a threshold signal intensity, and repeating the above steps if the first average signal intensity is stronger than the threshold signal intensity or else switching to a second antenna, if the first average signal intensity is-weaker than the threshold signal intensity. The step of switching to the second antenna further comprises: receiving the packets of the signal and recording a second average signal intensity within the checking time, switching back to the first antenna and operating with it if the packet is resent to the second antenna over a predetermined times or else comparing the second average signal intensity with the first average signal intensity and switching back to the first antenna if the second average signal intensity is weaker than the first average signal intensity. Furthermore, if the second average, signal intensity is stronger than the first average signal intensity, keep on operating with the second antenna.

Other objects, features, and advantages of the invention will become apparent from the following detailed description of the preferred but non-limiting embodiments. The following description is made with reference to the accompanying drawings.

DETAILED DESCRIPTION OF THE INVENTION

The method for antenna diversity of the invention will be described with reference to the accompanying drawings.

In a typical wireless local area network, since the signal intensity does not fluctuate seriously, signals received by an antenna do not vary with time rapidly. Considering this fact, the invention records the signal intensity of a zone (e.g. a plurality of packets) as the reference for antenna diversity, in contrast to the packet-by-packet detection of the conventional method.

Figure 1:
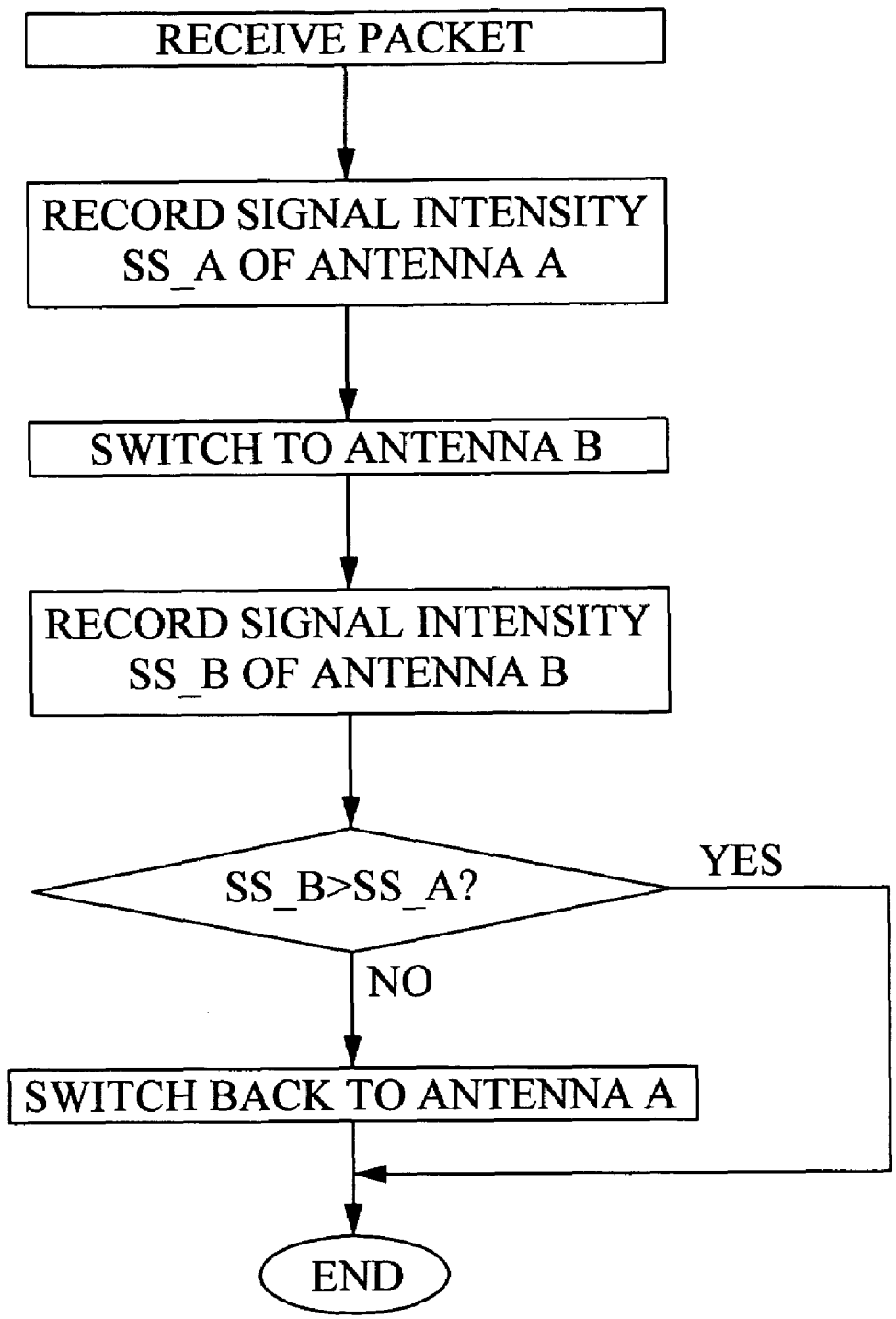
FIG. 1 is a flowchart showing a conventional antenna diversity method by using a packet-by-packet signal intensity comparison.
Figure 2A:
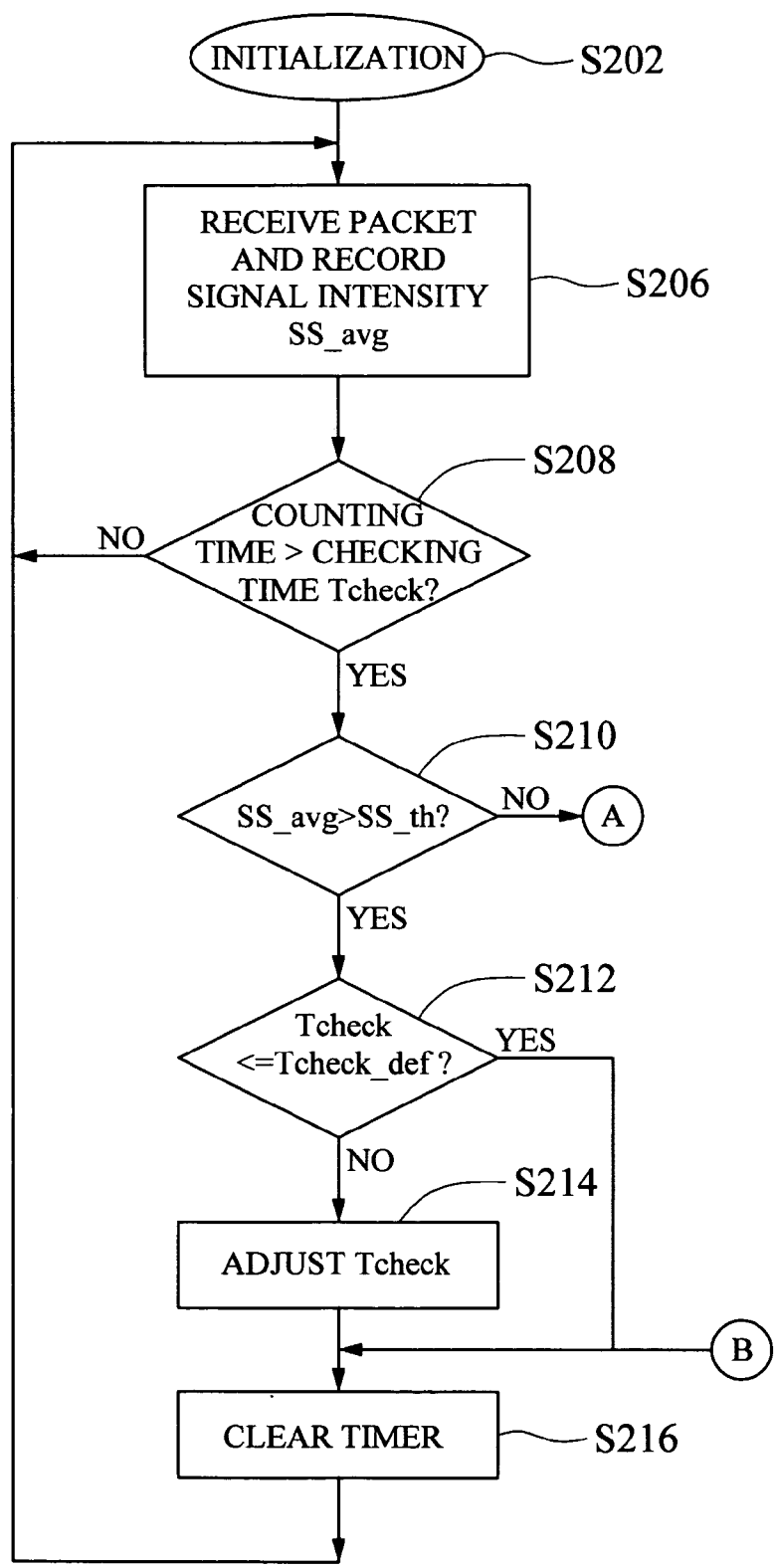
FIGS. 2A-2B are flowcharts showing an antenna diversity method according to an embodiment of the present invention.
Figure 2B:
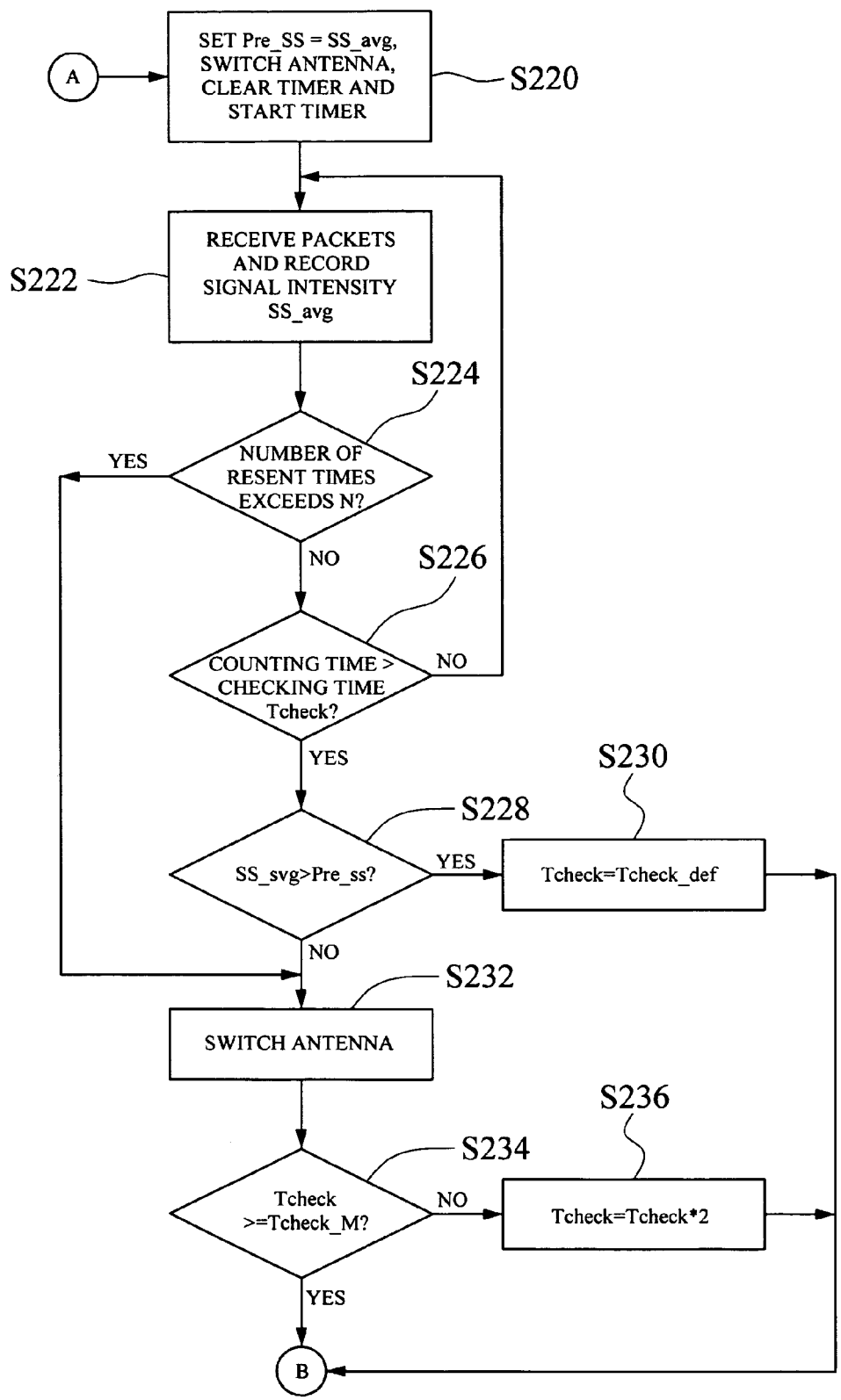

FIGS. 2A-2B are flowcharts showing an antenna diversity method according to an embodiment of the invention. The method as shown in FIGS. 2A-2B is more suitable for a situation with stronger signals. According to this method, the system continuously monitors the signal intensity of the selected antenna and records the average signal intensity of the antenna. An instance of calculating the average signal intensity SS_avg is to use an exponential weight of each packet intensity, such as shown in Equation (1):

$$SS\_avg(n)=\beta*SS\_avg(n-1)+(1-\beta)*RSSI \qquad (1),$$

wherein β is the weight, RSSI is the signal intensity of the latest packet, and n is the number of the current packet.

When a checking time Tcheck arrives and the average signal intensity SS_avg measured within the checking time is higher than, a threshold signal intensity SS_th, the antenna will not be switched, or else the signal intensity will be recorded as Pre_SS and the antenna will be switched to another antenna to measure a new average signal intensity SS_avg. During the measurement, the system still receives new packets for processing and the new average signal intensity SS_avg is also measured within the checking time Tcheck. After the checking time Tcheck, the present antenna is held and the checking time Tcheck is reset to be equal to the default value Tcheck_def if SS_avg is larger than Pre_SS. Conversely, when SS_avg is smaller than or equal to Pre_SS, the present antenna may receive signals inefficiently or cannot receive any signal, and thus the present antenna is switched back to the original antenna and the checking time Tcheck is adjusted (e.g. multiplying the checking time). Preferably, the checking time Tcheck is not expected to be larger than a maximum checking time Tcheck_M.

Because the change of the WLAN environment is not violent, it is not necessary to compare the performances between different antennas frequently. In particular, if the signal received by the optimum antenna is also very weak, the frequently switching will cause the intermittent phenomenon of receiving the signal. However, when the comparison is made as the antenna is switching, it is necessary to switch back to the original antenna immediately if the packet is not well transmitted (e.g. the packet has been resent for N times). The main reason is that the transmitting and receiving procedures use the same frequency channel in the TDD (Time-Division Duplex) transceiver. Thus, the antenna with good receiving capability represents that the transmitting capability is better, the antenna with poor transmitting capability represents that the receiving capability is also poor, and vice versa. On the other hand, if the average signal intensity SS_avg of the received packets is kept above the threshold signal intensity SS_th, the antenna does not have to be switched. This is because, in the digital communication, when the signal intensity is higher than a required value and the noise intensity is constant, the bit error rate is always lower than a specific level. However, it is tolerable to shorten the checking time (for example, the checking time is divided by an integer), so as to quickly respond to the sudden drop of signal intensity. Please note that the checking time is supposed to be larger than the default value Tcheck_def.

The antenna diversity method according to the embodiment of the invention as shown in FIG. 2A-2B includes the following steps.

Step S202 indicates initialization. The checking time Tcheck is set to the default value Tcheck_def, and the number of resent times Nres is set. The timer's counting time Timer is cleared, and the timer is for counting the time of the checking time.

Step S206 is for receiving the packets and recording the average signal intensity SS_avg. The average signal intensity SS_avg may be calculated according to Equation (1).

Step S208 is for comparing the counting time Timer to the checking time Tcheck. If Timer is less than Tcheck, the process proceeds back to the previous step S206; and if Timer is larger than the checking time Tcheck, a next step S210 is performed.

Step S210 is for comparing the average signal intensity SS_avg to a threshold signal intensity SS_th. If SS_avg is larger than SS_th, there is no need to switch the antenna and the process proceeds to step S212. If SS_avg is smaller than SS_th, the average signal intensity SS_avg of another antenna has to be detected, and thus the process proceeds to step S220.

Step S212 is for comparing the checking time Tcheck to the default checking time Tcheck_def. If Tcheck is greater than Tcheck_def, the process proceeds to step S214. If Tcheck, is smaller than or equal to Tcheck_def, the process proceeds to step S216.

Step S214 is for adjusting (e.g. halving) the checking time Tcheck.

Step S216 is for clearing the counting time of the timer, and the process proceeds back to step S216.

Step S220 is for setting a final average signal intensity Pre_SS of the original antenna equal to SS_avg and switching the antenna while the timer's counting time is cleared and the timer starts to count the time.

Step S222 is for receiving packets and recording the average signal intensity SS_avg: The average signal intensity SS_avg may be calculated according to Equation (1). If the system resends the packet, the number of resent times is recorded.

In step S224, if the number of resent times exceeds the threshold value N, the present antenna should have poor receiving condition and thus the process proceeds to step S232. If the number of resent times is smaller than the threshold value N, the process proceeds to step S226.

Step S226 is for comparing the counting time to the checking time Tcheck. If the counting time is smaller than the checking time Tcheck, the process proceeds back to step S222. If the counting time is greater than the checking time Tcheck, a next step S228 is performed.

Step S228 is for comparing the average signal intensity SS_avg, to the final average signal intensity Pre_SS. If SS_avg is greater than Pre_SS, the present antenna should have better performance than the original antenna and thus the process proceeds to step S230. If SS_avg is smaller than the final average signal intensity Pre_SS, the performance of the present antenna is supposed to be worse than the original antenna and the process proceeds to step S232.

Step S230 is for setting the checking time Tcheck to the default value Tcheck_def, and then the process proceeds back to step S216.

Step S232 is for switching the antenna, which means that the present antenna is switched back to the original antenna because the performance of the present antenna is worse than the original antenna.

Step S234 is for comparing the checking time Tcheck to the maximum threshold value Tcheck_M. If Tcheck is greater than or equal to Tcheck_M, the process proceeds to step S216. If Tcheck is smaller than Tcheck_M, the process proceeds to step S236.

Step S236 is for adjusting (e.g. doubling) the checking time Tcheck.

Because the antenna diversity method of the wireless network adapter, as shown in FIGS. 2A-2B, does not monitor the performance of the other antenna until the checking time arrives, the embodiment cannot immediately respond to the situation when the signal is suddenly deteriorated, and is thus suitable for use in a situation with stronger signals. In a situation with weaker signals, the mechanism of the antenna diversity method of the wireless network adapter in FIG. 3 can be combined with the one as shown in FIGS. 2A-2B, so as to quickly respond to the sudden degradation of the signal intensity. That is, when the wireless network adapter has poor transmitting conditions, e.g. failure to transmit N packets consecutively, or poor receiving conditions, e.g. failure to receive a desired signal within some period of time, the operating antenna is immediately switched, and the checking time is set to the default value Tcheck_def.

Figure 3:
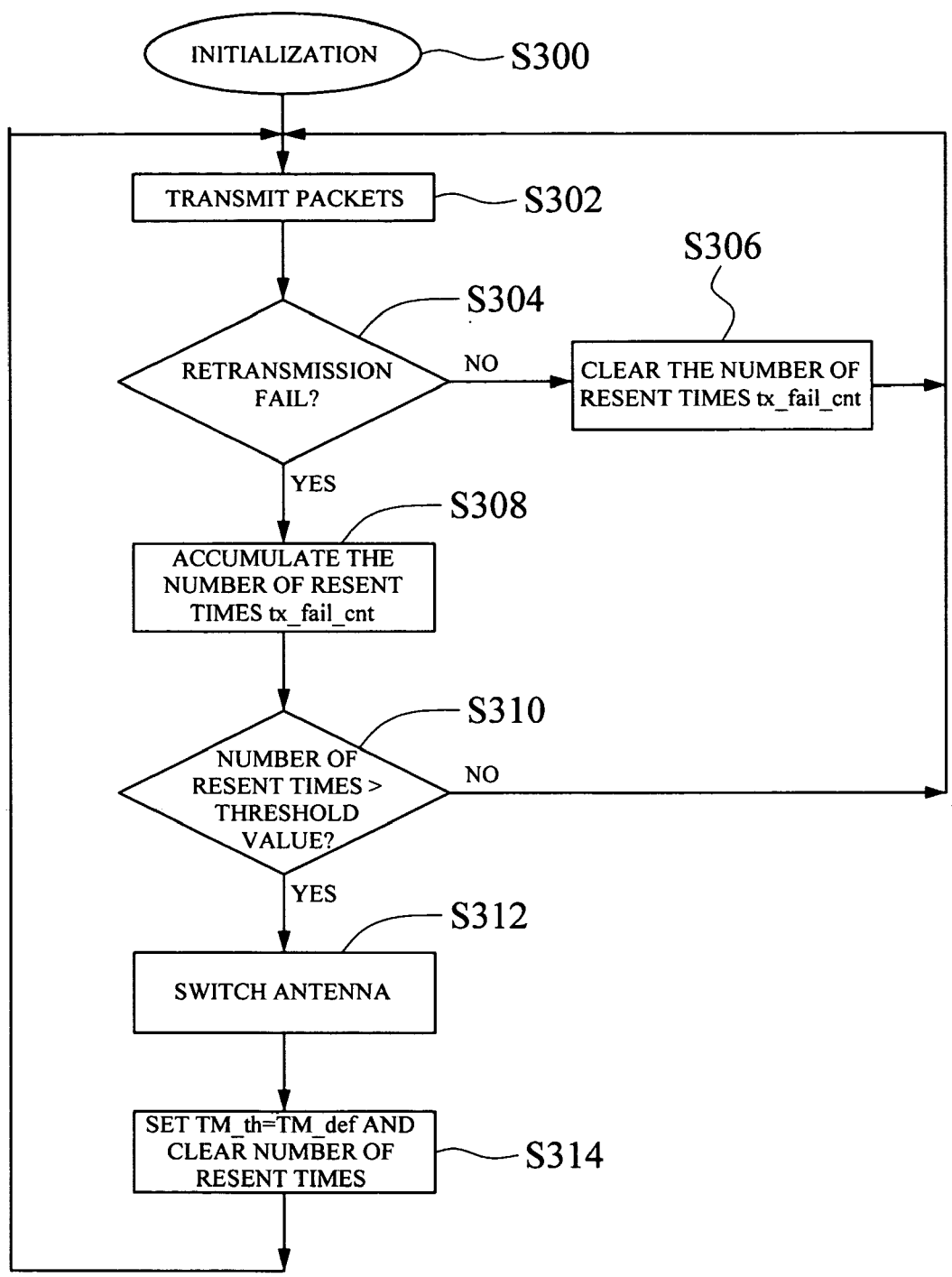
FIG. 3 is a flowchart showing an antenna diversity method by checking the resent packets according to an embodiment of the present invention.

As shown in steps S304 to S308 in the flowchart of FIG. 3, if the packets are resent, the number of resent times is accumulated; and if the packets are not resent, the number of resent times is cleared. In steps S310 to S314, if the number of resent times exceeds a threshold number of resent times, the operating antenna is switched and the checking time is reset to the default value Tcheck_def.

Figure 4:
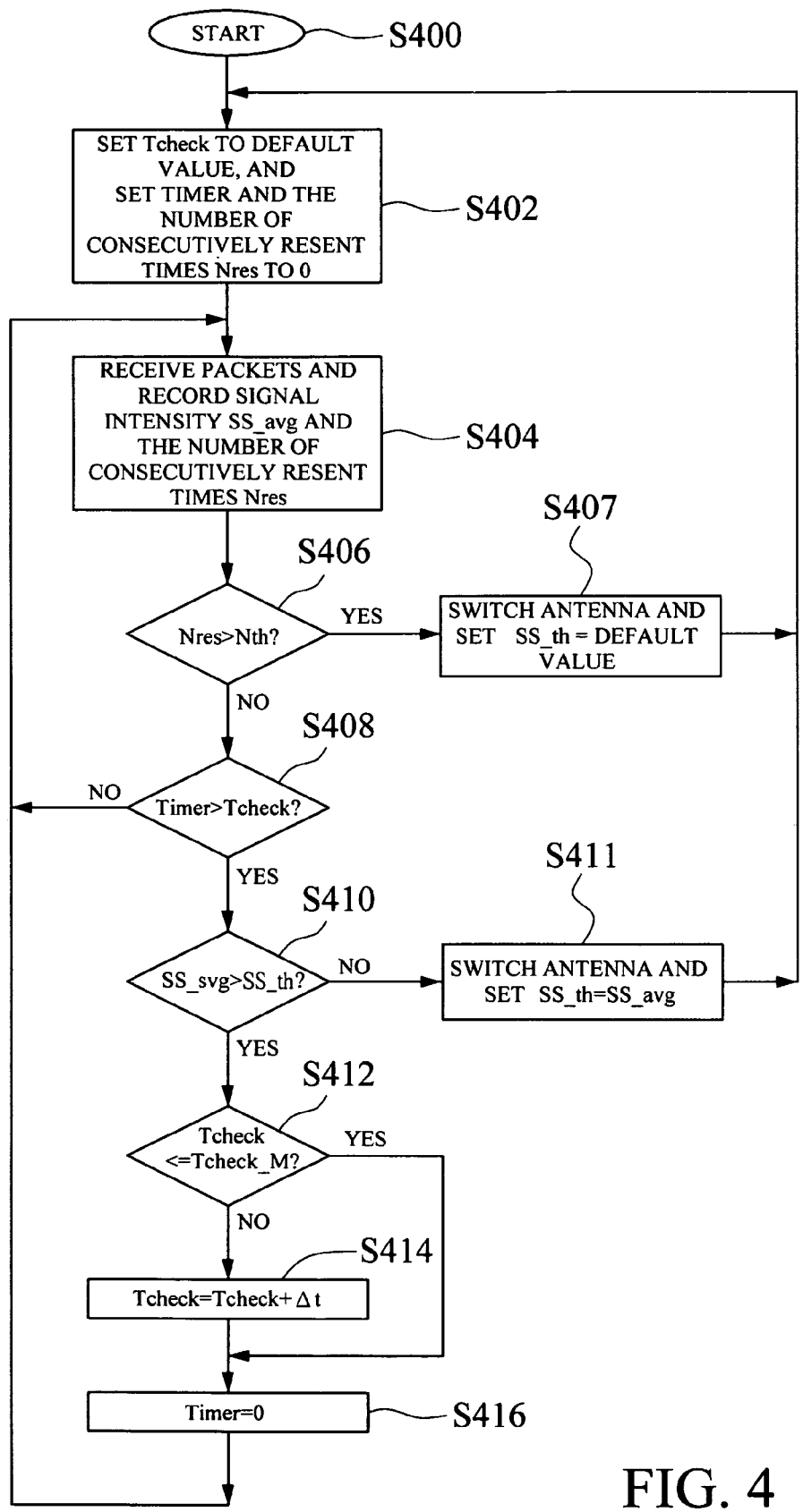
FIG. 4 is a flowchart showing another antenna diversity method according to another embodiment of the invention.

FIG. 4 is a flowchart showing another antenna diversity method according to another embodiment of the invention. The steps of the antenna diversity method will be described with reference to the flowchart of FIG. 4.

In Step S400, the method begins.

Step S402 indicates parameter initialization. This step is for setting the checking time Tcheck to the default checking time Tcheck_def, setting the number of continuously resent times Nres to zero, and clearing the counting time Timer recorded by a timer, wherein the timer is for counting the checking time.

Step S404 is for receiving packets, recording the average signal intensity SS_avg, and accumulating the number of continuously resent times Nres. The average signal intensity SS_avg may be calculated according to Equation (1).

Step S406 is for comparing the number of continuously resent times Nres to a threshold value Nth. If Nres is greater than Nth, the process proceeds to step S407; or otherwise the process proceeds to step S408.

Step S407 is for switching the antenna and setting the threshold signal intensity SS_th to the default value, and then the process proceeds back to step S402.

Step S408 is for comparing the counting time Timer to the checking time Tcheck. If Timer is smaller than Tcheck, the process proceeds back to step S404. If Timer is greater than Tcheck, step S410 is performed.

Step S410 is for comparing the average signal intensity SS_avg to the threshold signal intensity SS_th. If SS_avg is greater than SS_th, the antenna does not have to be switched, and the process proceeds to step S412. If SS_avg is smaller than SS_th, the intensity of another antenna has to be detected, and the process proceeds to step S411.

Step S411 is for switching the antenna and setting the threshold signal intensity $SS_{13}$th to the average signal intensity SS_avg, and then the process proceeds back to step S402.

Step S412 is for comparing the checking time Tcheck to the maximum checking time Tcheck_M. If Tcheck is not smaller than Tcheck_M, the process proceeds to step S416. If Tcheck is smaller than Tcheck_M, the process proceeds to step S414.

Step S414 is for adjusting the checking time Tcheck by, for example, adding an accumulated time $\Delta t$ to the checking time Tcheck.

Step S416 is for clearing the timer's counting time Timer, and the process proceeds back to step S404.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for antenna diversity, comprising:
   operating with a first antenna and obtaining a first average signal intensity within a first checking time; and
   comparing the first average signal intensity with a threshold signal intensity and performing an optimizing action according to the comparing result, wherein the optimizing action comprises:
   switching the first antenna to a second antenna if the first average signal intensity is weaker than the threshold signal intensity;
   operating with the second antenna and obtaining a second average signal intensity within a second checking time;
   comparing the first average signal intensity with the second average signal intensity; and
   keeping on operating with the second antenna if the first average signal intensity is weaker than the second average signal intensity, or else switching the second antenna to the first antenna and operating with the first antenna.

2. The method of claim 1, wherein the optimizing action further comprising: increasing the first checking time if the first average signal intensity is stronger than the threshold signal intensity.

3. The method of claim 1, wherein the optimizing action further comprises: adjusting the first checking time.

4. The method of claim 1, wherein the optimizing action further comprises: adjusting at least one of the first checking time or the second checking time.

5. The method of claim 1, wherein the optimizing action further comprises:
   operating with the second antenna and receiving a packet; and
   switching to the first antenna if the packet is resent over at least two times.

6. The method of claim 1, wherein the threshold signal intensity is a predetermined intensity or an average signal intensity previously measured by one of the first antenna and a second antenna.

7. The method of claim 1, wherein the threshold signal intensity is changed to be equal to the second average signal intensity if the first average signal intensity is weaker than the second average signal intensity.

* * * * *